US010919394B2

(12) United States Patent
Keum et al.

(10) Patent No.: US 10,919,394 B2
(45) Date of Patent: Feb. 16, 2021

(54) POWER SYSTEM AND METHOD OF CONTROLLING THE SAME

(71) Applicant: MANDO CORPORATION, Gyeonggi-do (KR)

(72) Inventors: Ki Sub Keum, Gyeonggi-do (KR); Seongjoo Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 6 days.

(21) Appl. No.: 15/886,794

(22) Filed: Feb. 1, 2018

(65) Prior Publication Data

US 2018/0222324 A1 Aug. 9, 2018

(30) Foreign Application Priority Data

Feb. 3, 2017 (KR) .................. 10-2017-0015778

(51) Int. Cl.
*B60L 15/10* (2006.01)
*B60L 15/20* (2006.01)
*B60L 3/00* (2019.01)

(52) U.S. Cl.
CPC ............ *B60L 3/0061* (2013.01); *B60L 3/003* (2013.01); *B60L 3/0092* (2013.01); *B60L 15/10* (2013.01);
(Continued)

(58) Field of Classification Search
USPC ........................................ 318/139
See application file for complete search history.

(56) References Cited

U.S. PATENT DOCUMENTS

2014/0341252 A1* 11/2014 Kratzschmar .......... H02H 6/005
374/45
2015/0084570 A1* 3/2015 Hara .................... B62D 5/0403
318/494
2017/0359008 A1* 12/2017 Kano ....................... H02P 6/28

FOREIGN PATENT DOCUMENTS

CN 104467619 3/2015

OTHER PUBLICATIONS

Office Action dated Oct. 30, 2020 for Chinese Application No. 201810112526.7 and its English machine translation by Google Translate.

* cited by examiner

*Primary Examiner* — Jorge L Carrasquillo
(74) *Attorney, Agent, or Firm* — Ladas & Parry, LLP

(57) ABSTRACT

The present disclosure relates to a power system including: a plurality of Electronic Control Units (ECUs) configured to transfer power to a motor connected to an output terminal; a temperature section determination unit configured to determine whether first temperature information input from a first temperature sensor which senses the temperature generated from a first ECU corresponds to a normal section, a warning section, or a danger section, which are set in advance; a temperature comparison determining unit configured to determine whether the first temperature information is less than or equal to second temperature information input from a second temperature sensor which senses the temperature generated from a second ECU, in a case in which it is determined that the first temperature information corresponds to the warning section; and a controller configured to control the first ECU so that the first ECU reduces the power in a case in which it is determined that the first temperature information is less than or equal to the second temperature information, and to control the first ECU and the second (Continued)

ECU so that the first ECU does not transfer the power and the second ECU transfers the power in a case in which it is determined that the first temperature information is greater than the second temperature information.

11 Claims, 9 Drawing Sheets

(52) U.S. Cl.
 CPC ......... *B60L 15/20* (2013.01); *B60L 2240/425* (2013.01); *B60L 2240/525* (2013.01); *Y02T 10/72* (2013.01); *Y02T 10/92* (2013.01)

FIG. 7
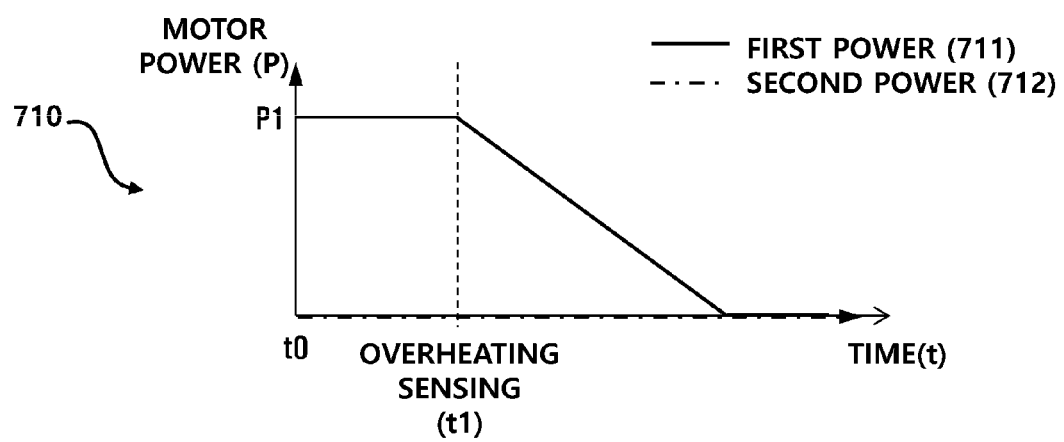
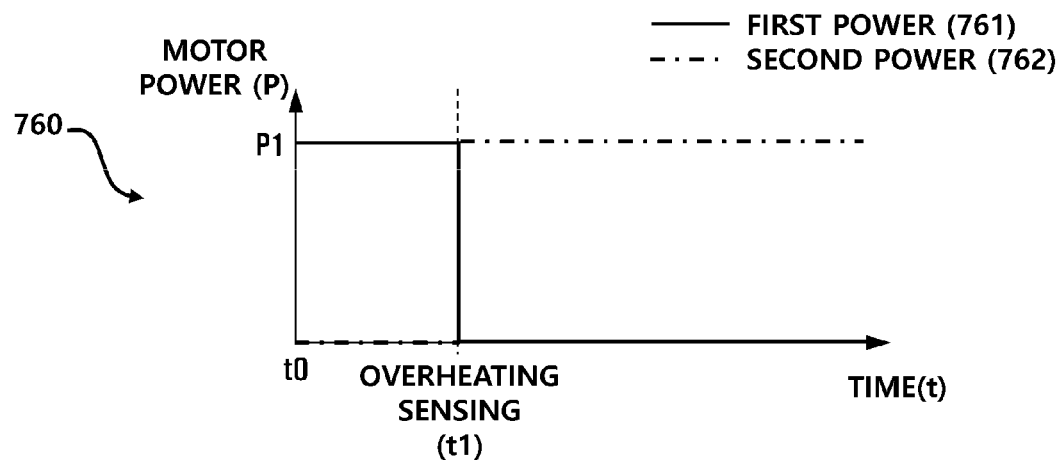

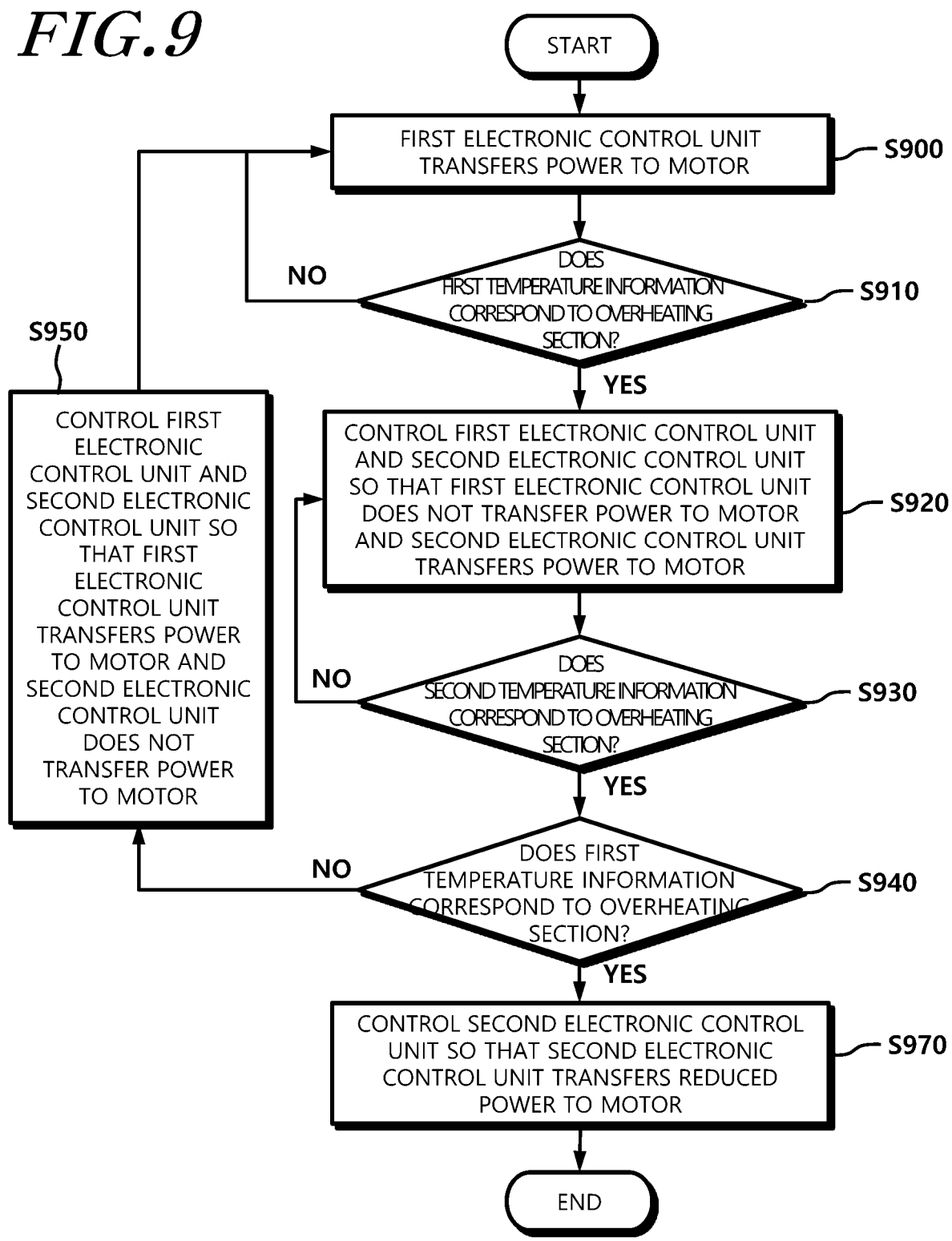

POWER SYSTEM AND METHOD OF CONTROLLING THE SAME

CROSS REFERENCE TO RELATED APPLICATION

This application claims priority from Korean Patent Application No. 10-2017-0015778, filed on Feb. 3, 2017, which is hereby incorporated by reference for all purposes as if fully set forth herein.

BACKGROUND OF THE INVENTION

1. Field of the invention

The present embodiments relate to a power system which controls power of a motor.

2. Description of the Prior Art

In accordance with the digitization of vehicles, elements controlled mechanically or by oil pressure in the related art are now controlled by power transfer using a motor.

However, a vehicle controlled by a motor is prone to high temperatures, unlike a vehicle controlled mechanically or by oil pressure.

For this reason, in order to prevent breakdowns due to high temperature, the vehicle controlled by the motor includes a temperature sensor which senses a temperature, and in a case in which a high temperature that may cause a breakdown is sensed by the temperature sensor, an output of the motor is restricted.

The motor may be a steering motor which assists steering or an engine motor which moves a vehicle.

Since the steering motor and the engine motor perform important operations in a vehicle, restricting an output of the steering motor or the engine motor for preventing a breakdown may create a dangerous situation.

SUMMARY OF THE INVENTION

In this background, an aspect of the present embodiments is to provide a power system which can prevent breakdowns due to high temperature and maintain an output of a motor.

In accordance with an aspect of the present embodiment, there is provided a power system. The power system includes: a plurality of Electronic Control Units (ECUs) configured to transfer power to a motor connected to an output terminal; a temperature section determination unit configured to determine whether first temperature information input from a first temperature sensor which senses the temperature generated from a first ECU corresponds to a normal section, a warning section, or a danger section, which are set in advance; a temperature comparison determining unit configured to determine whether the first temperature information is less than or equal to second temperature information input from a second temperature sensor which senses the temperature generated from a second ECU, in a case in which it is determined that the first temperature information corresponds to the warning section; and a controller configured to control the first ECU so that the first ECU reduces the power in a case in which it is determined that the first temperature information is less than or equal to the second temperature information, and to control the first ECU and the second ECU so that the first ECU does not transfer the power and the second ECU transfers the power in a case in which it is determined that the first temperature information is greater than the second temperature information.

In accordance with another aspect of the present embodiment, there is provided a method of controlling a power system including a plurality of Electronic Control Units (ECUs) configured to transfer power to a motor connected to an output terminal. The method includes: a temperature section determining step of determining whether first temperature information input from a first temperature sensor which senses the temperature generated from a first ECU corresponds to a normal section, a warning section, or a danger section, which are set in advance; a temperature comparison determining step of determining whether the first temperature information is less than or equal to second temperature information input from a second temperature sensor which senses the temperature generated from a second ECU, in a case in which it is determined that the first temperature information corresponds to the warning section; and a controlling step of controlling the first ECU so that the first ECU reduces the power in a case in which it is determined that the first temperature information is less than or equal to the second temperature information, and controlling the first ECU and the second ECU so that the first ECU does not transfer the power and the second ECU transfers the power in a case in which it is determined that the first temperature information is greater than the second temperature information.

As described above, the present embodiments can provide a power system which can prevent a breakdown due to a high temperature and maintain an output of a motor.

BRIEF DESCRIPTION OF THE DRAWINGS

The above and other aspects, features and advantages of the present disclosure will be more apparent from the following detailed description taken in conjunction with the accompanying drawings, in which:

FIG. 7 is a diagram illustrating an example of a waveform of a motor power according to the operation of the power system according to an embodiment.

FIG. 9 is a flowchart illustrating an example of the operation of the power system according to another embodiment.

DETAILED DESCRIPTION OF THE EXEMPLARY EMBODIMENTS

Figure 1:
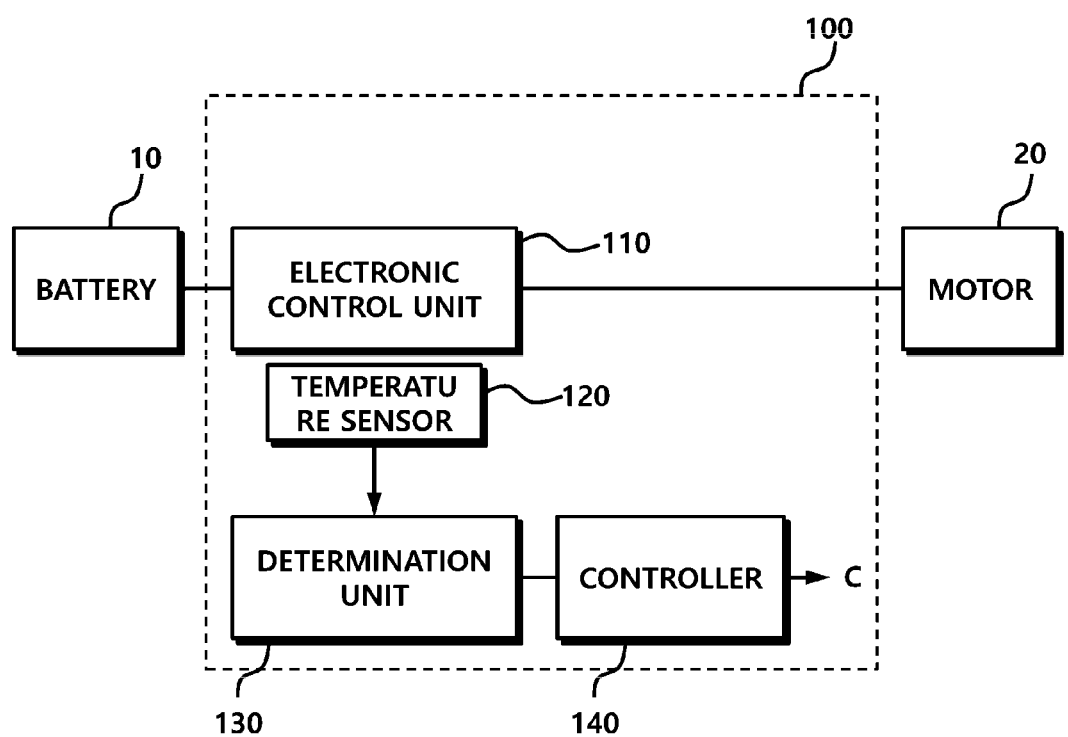
FIG. 1 is a diagram illustrating a configuration of a normal power system according to an embodiment.

Hereinafter, some embodiments will be described with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram illustrating a configuration of a normal power system according to an embodiment.

Referring to FIG. 1, the normal power system 100 according to an embodiment may include an Electronic Control Unit (ECU) 110 which transfers power of a battery connected to an input terminal to a motor 20, a temperature sensor 120 which senses temperature information related to a breakdown of the ECU 110, a determination unit 130 which determines breakdown danger of the ECU 110 on the basis of the sensed temperature information, and a controller 140 which controls the ECU according to the determination of whether a breakdown is likely to occur or not.

The ECU 110 included in the normal power system 100 according to an embodiment may be a power transfer device such as a converter or an inverter according to a characteristic of the battery 10 and a characteristic of the motor 20.

The temperature sensor 120 included in the normal power system 100 according to an embodiment is a sensor capable of sensing the temperature information related to the breakdown of the ECU 110, and any type of temperature sensor may be used as the temperature sensor 120.

The determination unit 130 included in the normal power system 100 according to an embodiment may determine the breakdown danger of the ECU 110 on the basis of the temperature information input from the temperature sensor 120.

For example, the determination unit 130 may determine that there is no breakdown danger of the ECU 110 in a case in which the temperature information input from the temperature sensor 120 is less than or equal to a predetermined normal threshold temperature, and may determine that there is the breakdown danger of the ECU 110 in a case in which the temperature information is greater than the predetermined normal threshold temperature. The normal threshold temperature may be set on the basis of a previously known characteristic of the ECU 110.

The controller 140 included in the normal power system 100 according to an embodiment may generate a control signal C for controlling the ECU 110 according to the result of determination by the determination unit 130.

For example, in a case in which there is the breakdown danger of the ECU 110, the controller 140 may generate the control signal C which enables the ECU 110 to reduce the power transferred to the motor 20. Therefore, power loaded on the ECU 110 may be reduced, and thus the breakdown danger of the ECU 110 may be reduced.

In contrast, in a case in which there is no the breakdown danger of the ECU 110, the controller 140 may generate the control signal C which enables the ECU 110 to maintain the power transferred to the motor 20. Therefore, the motor 20 may be normally operated. The normal operation may refer that the motor 20 is operated under a control of a motor system (not shown).

Specifically, the motor system (not shown) which normally operates the motor 20 may be present, and the normal power system 100 may be additionally connected to the motor system, and thus the motor 20 may be controlled. The motor system may share the ECU 110 with the normal power system 100. The motor system may synthesize a control signal generated from the motor system and a control signal generated from the power system 100. The motor system may input the synthesized control signals to the ECU 110 to control the power input to the motor.

Figure 2:
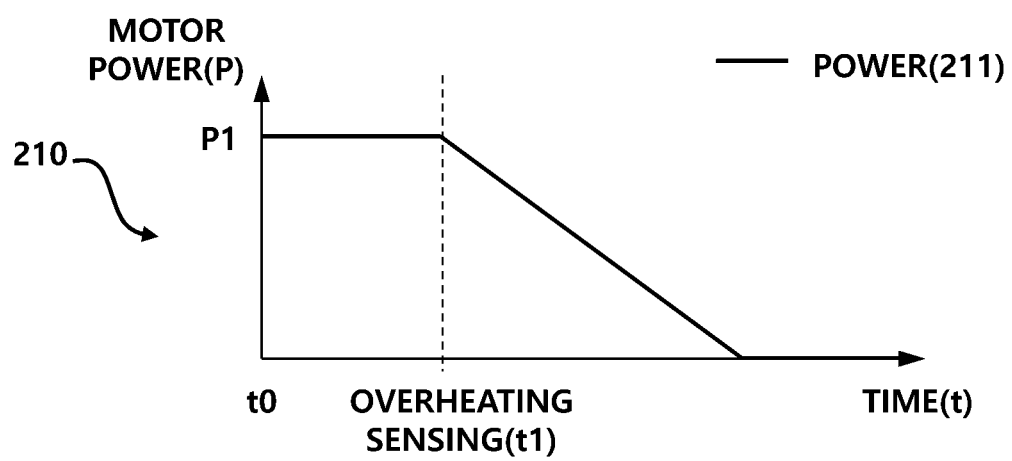
FIG. 2 is a diagram illustrating an example of a waveform of motor power according to an operation of the normal power system according to an embodiment.

The normal power system 100 according to an embodiment, which is operated as described above, may output a waveform for motor power as illustrated in FIG. 2.

FIG. 2 is a diagram illustrating an example of the waveform of the motor power according to the operation of the normal power system.

FIG. 2 illustrates the waveform 210 of the motor power 210 according to the operation of the normal power system.

Referring to the waveform 210 of FIG. 2, in a case in which overheating of the ECU 110 is not sensed (i.e., in a case in which a time is a period from t0 to t1), the normal power system 100 according to an embodiment may transfer power 211 of a normal power value P1 to the motor 20. The sensing overheating refers to sensing the temperature greater than a predetermined normal threshold temperature.

In a case in which the overheating of the ECU 110 is sensed (i.e., in a case in which the time is a period after t1), the normal power system 100 according to an embodiment may transfer the power 211 which is gradually reduced from the normal power value P1.

In general, as the power transferred to the motor increases, the danger of breakdown of the ECU 110 may be greater. Therefore, the normal power system 100 according to an embodiment can prevent the breakdown of the ECU 110.

However, in the normal power system 100 according to an embodiment, the motor 20 may not be operated normally due to the operation for preventing the breakdown of the ECU 110.

For example, in a case in which the motor 20 is a steering motor which assists steering, a problem in which steering of a vehicle is less than an amount of steering required by a driver may be caused by the operation for preventing the breakdown of the ECU 110 by the normal power system 100 according to an embodiment.

As another example, in a case in which the motor 20 is an engine motor for driving a vehicle, a problem in which a vehicle moves at a lower speed than the speed required by a driver may be caused by the operation for preventing the breakdown of the ECU 110 by the normal power system 100 according to an embodiment.

In consideration of such circumstances, disadvantages of the normal power system 100 according to an embodiment may cause a collision of a vehicle, and thus the disadvantages should not be ignored.

Hereinafter, a power system which can prevent the breakdown of the ECU in the same manner as the normal power system described using FIGS. 1 and 2, and which can furthermore normally operate a motor is described in detail. In addition, descriptions overlapping the descriptions of FIGS. 1 and 2 are omitted.

Figure 3:
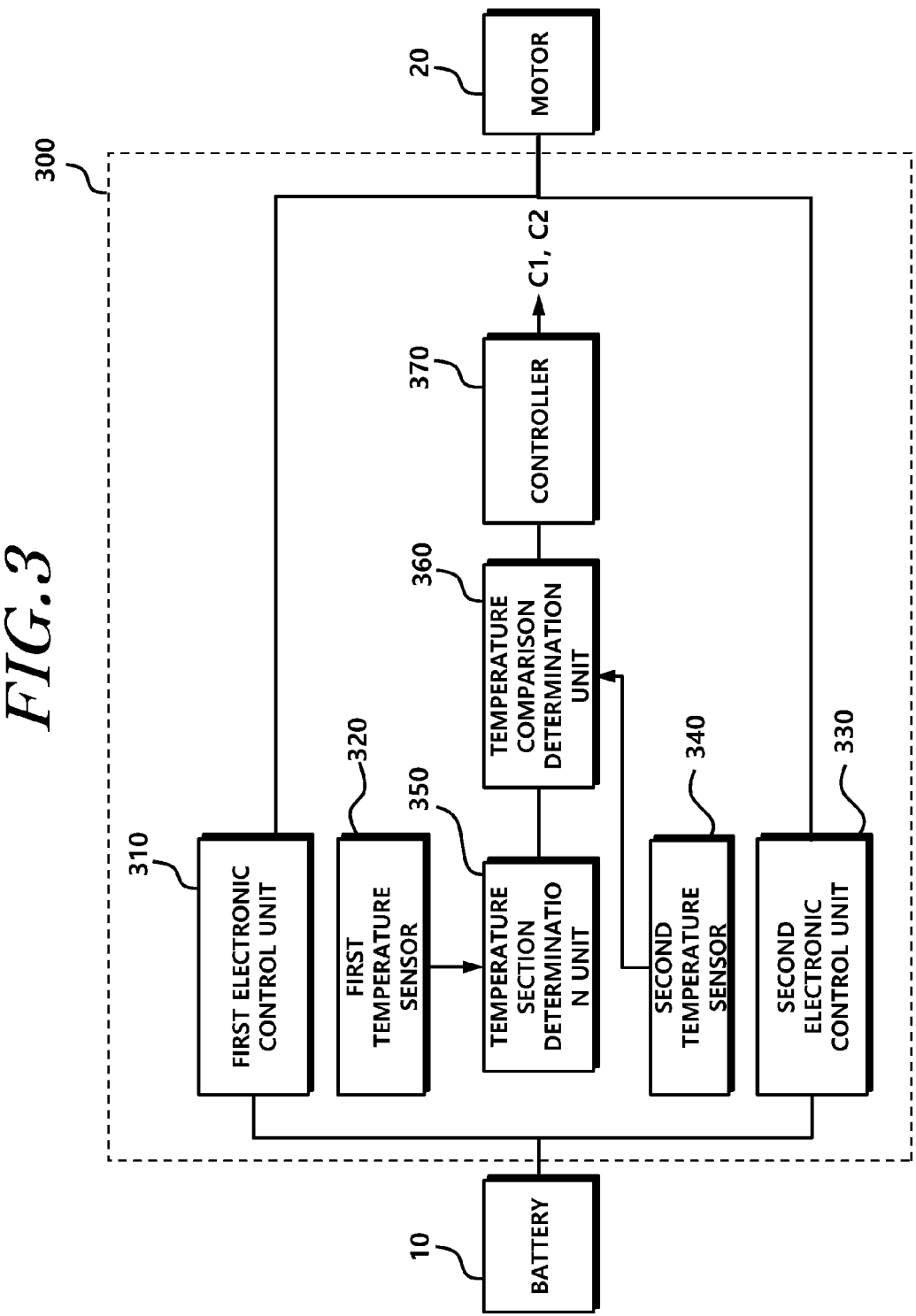
FIG. 3 is a diagram illustrating a configuration of a power system according to an embodiment.

FIG. 3 is a diagram illustrating a configuration of a power system according to an embodiment.

Referring to FIG. 3, the power system 300 according to an embodiment may include a plurality of Electronic Control Units (ECUs) including a first ECU 310 and a second ECU 330 and configured to transfer power to the motor 20 connected to an output terminal, a temperature section determination unit 350 configured to determine whether first temperature information input from a first temperature sensor 320 which senses the temperature generated from the first ECU 310 corresponds to a normal section, a warning section, or a danger section, which are set in advance, a temperature comparison determining unit 360 configured to determine whether the first temperature information is less than second temperature information input from a second temperature sensor 340 which senses the temperature generated from the second ECU 330, in a case in which it is determined that the first temperature information corresponds to the warning section, and a controller 370 configured to control the first ECU 310 so that the first ECU 310 reduces the power transferred to the motor 20 in a case in which it is determined that the first temperature information is less than or equal to the second temperature information, and to control the first ECU 310 and the second ECU 330 so that the first ECU 310 does not transfer the power to the motor 20 and the second ECU 330 transfers the power to the power 20 in a case in which it is determined that the first temperature information is greater than the second temperature information.

In an embodiment, the temperature section determination unit 350 may determine whether the first temperature information input from the first temperature sensor 320 which senses the temperature generated from the first ECU 310 and the second temperature information input from the second temperature sensor 340 which senses the temperature generated from the second ECU 330 correspond to a predetermined overheating section. The predetermined overheating section may refer to the temperature which may cause a breakdown, such as a predetermined threshold temperature.

In an embodiment, in a case in which it is determined that the first temperature information corresponds to the overheating section, the controller 370 may control the first ECU 310 and the second ECU 330 so that the first ECU 310 does not transfer the power and the second ECU 330 transfers the power, and in a case in which it is determined that the second temperature information corresponds to the overheating section while the second ECU 330 transfers the power, the controller 370 may control the second ECU 330 so that the second ECU 330 reduces the power.

In an embodiment, in a case in which it is determined that the first temperature information does not correspond to the overheating section while the second ECU 330 transfers the power, the controller 370 may control the first ECU 310 and the second ECU 330 so that the first ECU 310 transfers the power and the second ECU 330 does not transfer the power.

The first ECU 310 and the second ECU 330 included in the power system 300 according to an embodiment may be power transfer devices such as a converter or an inverter according to the characteristic of the battery 10 and the characteristic of the motor 20.

The first temperature sensor 320 and the second temperature sensor 340 included in the power system 300 according to an embodiment may sense the first temperature information which is temperature information of the first ECU 310 and the second temperature information of the second ECU 330, respectively.

The first temperature information and the second temperature information may refer to information related to a breakdown of the first ECU 310 and information related to a breakdown of the second ECU 320, respectively.

The power system 300 according to an embodiment may apply information (e.g., current information, voltage information, frequency information, and the like) related to the breakdown of the first ECU 310 and the second ECU 330 rather than the temperature information.

The temperature section determination unit 350 included in the power system 300 according to an embodiment may determine whether the first temperature information input from the first temperature sensor 320 corresponds to the normal section, the warning section, or the danger section, which are set in advance.

The normal section may refer to a section to which the first temperature information corresponds in a case in which the first ECU 310 is normally operated without a breakdown danger. The warning section may refer to a section to which the first temperature information corresponds in a case in which the first ECU 310 is normally operated with some breakdown danger. The danger section may refer to a section to which the first temperature information corresponds in a case in which the first ECU 310 is abnormally operated with the breakdown danger. In general, the normal section, the warning section, and the danger section may be set so as not to overlap one another.

In addition, each of normal temperature information included in the normal section, warning temperature information included in the warning section, and danger temperature information included in the danger section may satisfy the following Equation 1.

$$\text{Normal temperature information} < \text{warning temperature information} < \text{danger temperature information} \quad \text{[Equation 1]}$$

The normal section, the warning section, and the danger section may be set in advance on the basis of data from experimentation performed in advance on the first ECU 310.

The temperature comparison determination unit 360 included in the power system 300 according to an embodiment may determine whether the first temperature information is less than or equal to the second temperature information input from the second temperature sensor 340, in a case in which it is determined that the first temperature information corresponds to the warning section.

The controller 370 included in the power system 300 according to an embodiment may generate a first control signal C1 for controlling the first ECU 310 and a second control signal C2 for controlling the second ECU 330. For example, in a case in which it is determined that the first temperature information is less than or equal to the second temperature information, the controller 370 included in the power system 300 may generate the first control signal C1 which controls the first ECU 310 so that the first ECU 310 reduces the power, and in a case in which it is determined that the first temperature information is greater than the second temperature information, the controller 370 may generate the first control signal C1 which controls the first ECU 310 so that the first ECU 310 does not transfer the power and the second control signal C2 which controls the second ECU 330 so that the second ECU 330 transfers the power.

That is, in a case in which some breakdown danger is present in the first ECU 310 (i.e., in a case in which the first ECU 310 corresponds to the warning section) and the temperature generated from the first ECU 310 is less than or equal to the temperature generated from the second ECU 330, the controller 370 may generate the control signal C1 which enables the first ECU 310 to reduce the power transferred to the motor 20. Therefore, power loaded on the first ECU 310 may be reduced, and thus the breakdown danger of the first ECU 310 may be reduced.

In a case in which some breakdown danger is present in the first ECU 310 (i.e., in a case in which the first ECU 310 corresponds to the warning section) and the temperature generated from the first ECU 310 is greater than the temperature generated from the second ECU 330, the controller 370 may generate the control signal C1 which enables the first ECU 310 to perform control so as not to transfer power to the motor 20 and the control signal C2, which enables the second ECU 330 to transfer the power to the motor 20. Therefore, the power loaded on the first ECU 310 is zero, and thus the breakdown danger of the first ECU 310 may be reduced. In addition, the second ECU 330 transfers the power to the motor 20, and thus the motor 20 may be normally operated.

The power system 300 according to an embodiment, which is operated as described above, can normally operate the motor 20 by normally transferring the power to the motor 20, even though the power system 300 prevents the breakdown of the first ECU 310.

In general, in the power system 300 including the first ECU 310 and the second ECU 330, the first ECU 310 may be operated as a main device and the second ECU 330 may be operated as a sub or backup device. Therefore, in general, the temperature generated from the first ECU 310 is greater than the temperature generated from the second ECU 330.

Therefore, in general, the controller 370 may generate the control signal C1 which enables the first ECU 310 to perform control so as not to transfer power to the motor 20, and the control signal C2, which enables the second ECU 330 to transfer power to the motor 20.

When such circumstances are considered, an effect in which the power system may normally transfer the power to the motor 20 even though the power system prevents the breakdown of the first ECU 310, which is a characteristic of the power system according to an embodiment may be clear.

The controller of the power system according to an embodiment may be divided into a first controller which controls the first ECU and a second controller which controls the second ECU.

Therefore, the first controller may transmit, to the second controller, information on controlling the first ECU so that the first ECU does not transfer the power. In addition, the second controller may control the second ECU so that the second ECU transfers the power in a case in which the second controller receives, from the first controller, the information on control for preventing the transfer of power. The first controller and the second controller may transmit or receive the information using a Controller Area Network (CAN).

Hereinafter, the operation of the power system according to an embodiment, which is illustrated in FIG. 3, is described in detail.

Figure 4:
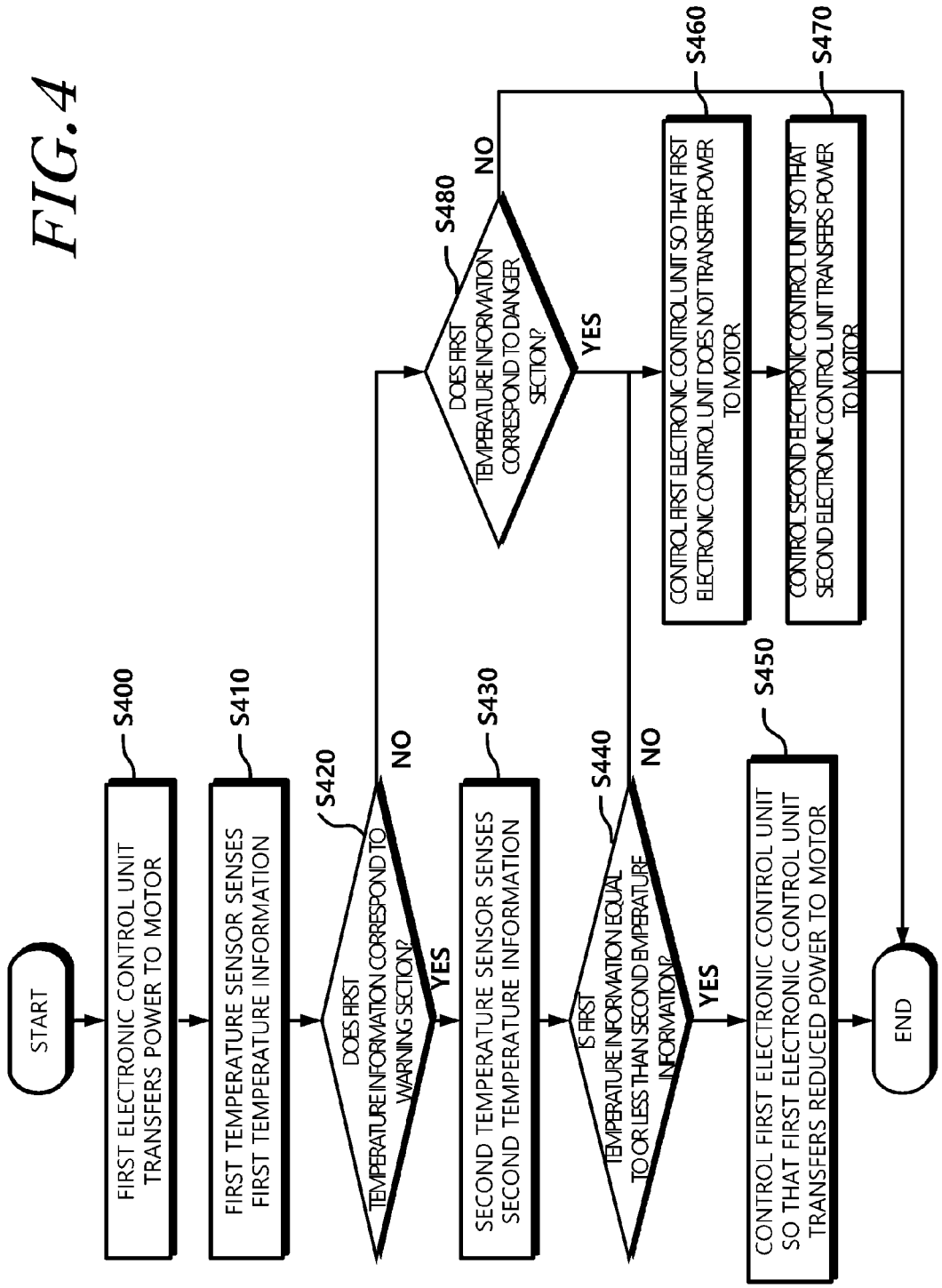
FIG. 4 is a flowchart illustrating an example of an operation of the power system according to an embodiment.

FIG. 4 is a flowchart illustrating an example of the operation of the power system according to an embodiment.

Referring to FIG. 4, the first ECU of the power system according to an embodiment may transfer the power to the motor (S400).

For example, in step S400, the operation of the first ECU may refer to the operation by the motor system rather than the operation by the power system according to an embodiment.

Specifically, the motor system which normally operates the motor may be present, and the power system according to an embodiment may be additionally connected to the motor system, and thus the motor may be controlled. The motor system may share the first ECU with the power system according to an embodiment. In addition, the motor system may synthesize a control signal generated from the motor system and a control signal generated from the power system 300 according to an embodiment. The motor system may input the synthesized control signals to the first ECU 310 to control the power input to the motor.

After step S400 is performed, the first temperature sensor included in the power system may sense the temperature information of the first ECU (S410).

After step 410 is performed, the temperature section determination unit included in the power system may determine whether the first temperature information corresponds to a predetermined warning section (S420).

In step S420, in a case in which it is determined that the first temperature information corresponds to the warning section (YES), the second temperature sensor included in the power system may sense the temperature information of the second ECU (S430).

That is, in a case in which it is determined that the first temperature information corresponds to the warning section, the second temperature sensor may sense the temperature. Specifically, the second temperature sensor may receive a signal (e.g., the signal may include a power signal) for determining an operation from the temperature section determination unit.

After step S430 is performed, the temperature comparison determination unit included in the power system may determine whether the first temperature information is equal to or less than the second temperature information (S440).

In step S440, in a case in which it is determined that the first temperature information is equal to or less than the second temperature information (YES), the controller included in the power system may control the first ECU so that the first ECU transfers the reduced power to the motor (S450).

As a specific example, the controller included in the power system may change (e.g., by applying a gain to a control signal) the control signal (i.e., a signal input to the first ECU) output from a controller of the motor system, to control the first ECU so that the first ECU transfers the reduced power to the motor.

Alternatively, the controller included in the power system may perform an arithmetic operation on a first control signal added to the control signal which is output from the controller of the motor system, to control the first ECU so that the first ECU transfers the reduced power to the motor.

In contrast, in step S440, in a case in which it is determined that the first temperature information is greater than the second temperature information (NO), the controller included in the power system may control the first ECU so that the first ECU does not transfer the power to the motor (S460).

As a specific example, the controller included in the power system may change the control signal (i.e., the signal input to the first ECU) output from the controller of the motor system (e.g., may change the control signal to zero by applying zero to the control signal) so as to control the first ECU so that the first ECU does not transfer the power to the motor.

Alternatively, the controller included in the power system may turn off the control signal input to the first ECU, to control the first ECU so that the first ECU does not transfer the power to the motor.

This will be described in detail with reference to FIG. 5.

Figure 5:
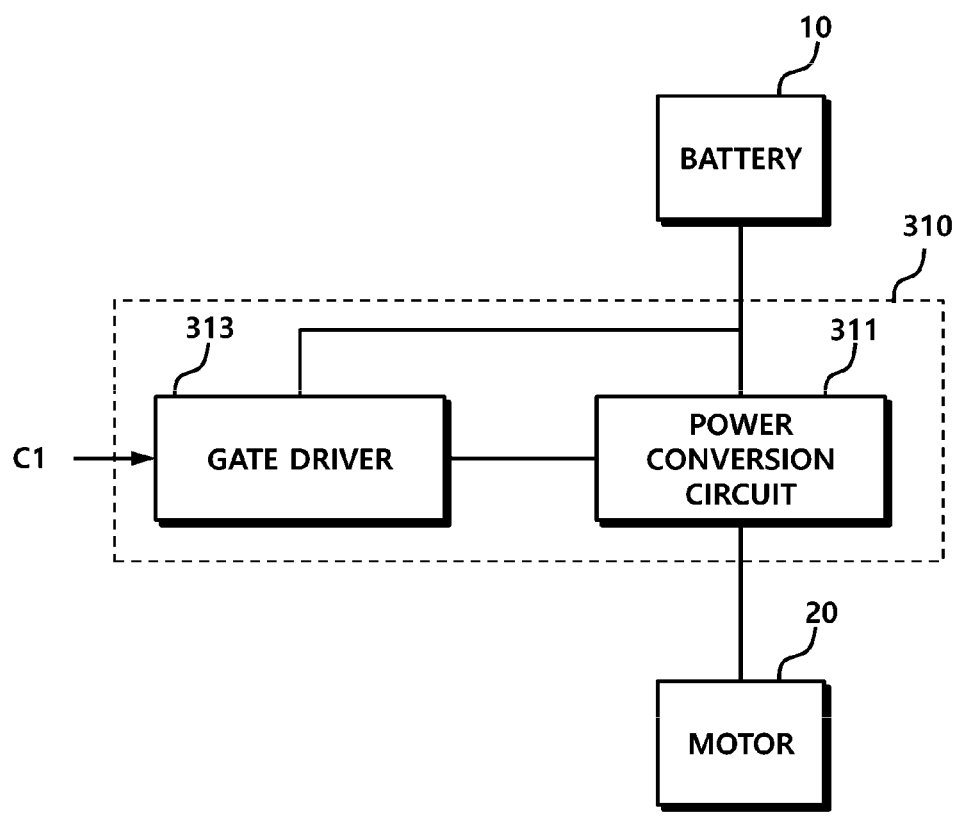
FIG. 5 is a diagram illustrating an example of a configuration of an Electronic Control Unit (ECU) included in the power system according to an embodiment.

FIG. 5 is a diagram illustrating an example of a configuration of the ECU included in the power system according to an embodiment.

Referring to FIG. 5, the first ECU 310 may include a power conversion circuit 311 which converts power input from the battery 10 and outputs the converted power to the motor 20, and a gate driver 313 which generates a switch signal on the basis of the input control signal C1 and the power of the battery 10 and inputs the switch signal to the power conversion circuit 311.

Therefore, the controller included in the power system may turn off the control signal C1 input to the gate driver 313 so as to turn off the switch signal.

Alternatively, the controller included in the power system may turn off the power of the battery 10, which is input to the gate driver 313, so as to turn off the switch signal.

Therefore, the first ECU 310 may not transfer the power of the battery 10 to the motor 20. In addition, the first ECU 310 may transfer the power of the battery 10 to the motor 20 by inversely applying such a principle thereto.

Alternatively, the controller included in the power system may turn off the power of the battery, which is input to the first ECU, so as to control the first ECU so that the first ECU does not transfer the power to the motor.

This will be described in detail with reference to FIG. 6.

Figure 6:
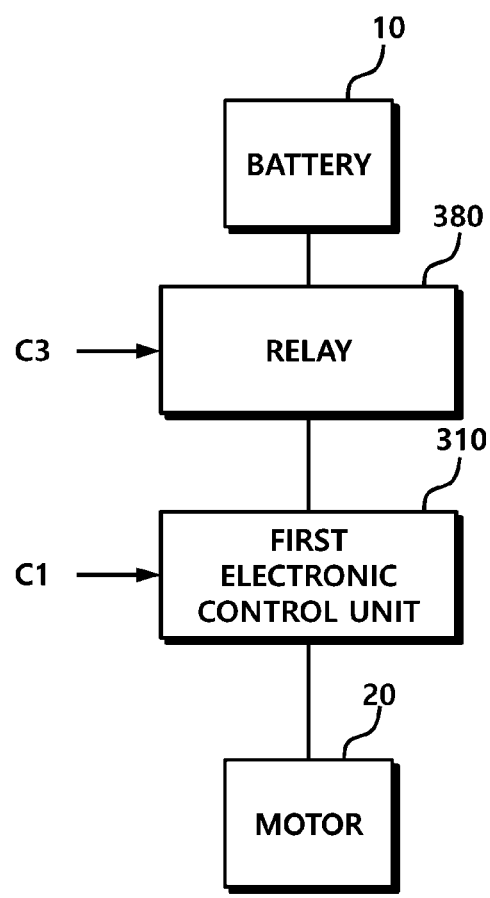
FIG. 6 is a diagram illustrating an example of a configuration of the ECU and a relay included in the power system according to an embodiment.

FIG. 6 is a diagram illustrating an example of a configuration of the ECU and a relay included in the power system according to an embodiment.

Referring to FIG. 6, the power system according to an embodiment may further include the relay 380 which is positioned between the first ECU 310 and the battery 10 to turn on or turn off the power of the battery 10.

Therefore, the controller included in the power system may generate a relay control signal C3 for turning off the relay 380 so as to turn off the power of the battery 10 input to the first ECU 310.

Accordingly, the first ECU 310 may not transfer the power of the battery 10 to the motor 20. In addition, the first ECU 310 may transfer the power of the battery 10 to the motor 20 by inversely applying such a principle thereto.

The first ECU is described with reference to FIGS. 5 and 6, but the descriptions related to FIGS. 5 and 6 may be applied to the second ECU similarly to the first ECU.

After step S460 is performed, the controller included in the power system may generate the control signal input to the second ECU in order to control the second ECU so that the second ECU transfers the power to the motor (S470).

This may inversely apply the principle in which the first ECU is controlled so as not to transfer the power to the motor in step S460.

In step S420, in a case in which it is determined that the first temperature information does not correspond to the warning section (NO), the temperature section determination unit included in the power system may determine whether the first temperature information corresponds to the danger section (S480).

In step S480, in a case in which it is determined that the first temperature information corresponds to the danger section (YES), the controller included in the power system may control the first ECU so that the first ECU does not transfer the power to the motor (S460) and control the second ECU so that the second ECU transfers the power to the motor (S470).

In general, since the first temperature information corresponds to the warning section in advance (i.e., since the first temperature information linearly changes, and the warning section is set with pieces of low temperature information compared to the danger section), a case in which step S420 is determined as NO and step S480 is determined as YES is unusual.

However, since the case in which step S420 is determined as NO and step S480 is determined as YES refers to a rapid increase of the first temperature information, the case may occur in a vehicle located in a dangerous environment. For example, the case may be a situation in which a vehicle is located in an environment where a rapid steering is required in a case where the motor is a steering motor. In contrast, the case may be a situation in which a vehicle is located in an environment where a rapid acceleration is required in a case in which the motor is an engine motor.

Therefore, in a case in which step S420 is determined as NO and step S480 is determined as YES, the controller may not reflect the temperature generated from the second ECU and may control the second ECU so that the second ECU transfers the power to the motor so as to induce the vehicle to escape the dangerous environment.

As described above, performing step S460 and step S410 followed by the determination as NO in step S420 and the determination as YES in step S480 may refer to shifting the danger of the breakdown to the second ECU rather than the first ECU, since the first ECU is more important than the second ECU.

More specifically, this is because the first ECU is operated as a main device differently from the second ECU which is operated as a sub or backup device. That is, this is because the first ECU may further be included in another system including a motor system in addition to the power system. In addition, the first ECU may have performance higher than that of the second ECU.

The power system according to an embodiment, which is operated as described above, may output a waveform of motor power as illustrated in FIG. 7.

FIG. 7 is a diagram illustrating an example of the waveform for the motor power according to the operation of the power system according to an embodiment.

FIG. 7 illustrates each of a first waveform 710 output in a case in which the first temperature information is less than or equal to the second temperature information and a second waveform 760 output in a case in which the first temperature information is greater than the second temperature information.

Referring to the first waveform 710 of FIG. 7, in a case in which the power system according to an embodiment does not sense the overheating of the first ECU (i.e., in a case in which a time is a period from t0 to t1), first power 711 transferred to the motor by the first ECU may be a normal power value P1, and second power 712 transferred to the motor by the second ECU may be zero. The normal power value P1 may refer to power transferred to the motor in a case in which the first ECU is operated by the control signal output from the controller of the motor system.

In such a situation, in a case in which the overheating of the first ECU is sensed (i.e., in a case in which the time is a period after t1), the first power 711 transferred to the motor by the first ECU may be gradually reduced from the normal power value P1, and the second power 712 transferred to the motor by the second ECU may be maintained at zero.

On the other hand, referring to the second waveform 760 of FIG. 7, in a case in which the power system according to an embodiment does not sense the overheating of the first ECU (i.e., in a case in which a time is a period from t0 to t1), first power 761 transferred to the motor by the first ECU may be a normal power value P1, and second power 762 transferred to the motor by the second ECU may be zero.

In such a situation, in a case in which the overheating of the first ECU is sensed (i.e., in a case in which the time is a period after t1), the first power 761 transferred to the motor by the first ECU may be rapidly reduced from the normal power value P1 and may be zero, and the second power 762 transferred to the motor by the second ECU may be rapidly increased and may be normal power value P1.

That is, in a case in which the first temperature information is greater than the second temperature information, the power system according to an embodiment may prevent the breakdown of the first ECU, and may normally operate the motor by normally transferring the power to the motor.

In the power system including the first ECU and the second ECU, the first ECU may be operated as a main device and the second ECU may be operated as a sub or backup device. Therefore, the temperature generated from the first ECU may be greater than the temperature generated from the second ECU 330.

When such circumstances are considered, an effect in which the power system prevents the breakdown of the first ECU and normally transfers the power to the motor, which is a characteristic of the power system according to an embodiment may be clear.

In the descriptions of the proposed power system, made with reference to FIGS. 3 to 7, as the plurality of ECUs, only the first ECU and the second ECU are illustrated in FIGS. 3 to 7, but this is merely an example, and the plurality of ECUs are not limited thereto. That is, the proposed power system may include three or more ECUs, and an operation thereof may be similar to that described with reference to FIGS. 3 to 7.

Hereinafter, a method of controlling the power system described using FIGS. 3 to 7 is described in brief.

Figure 8:
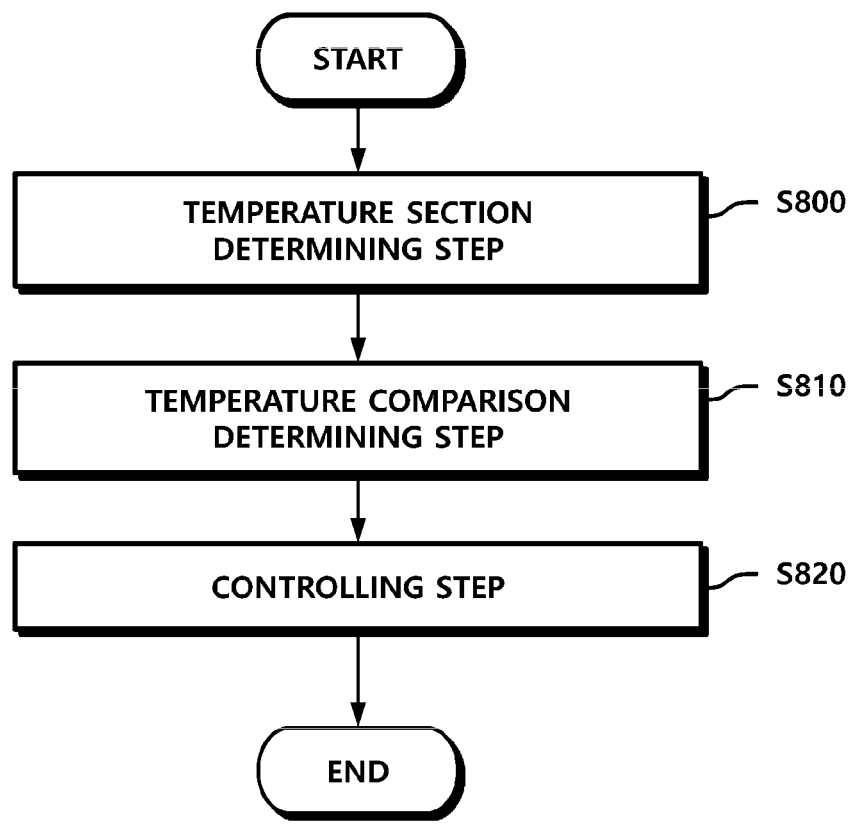
FIG. 8 is a flowchart illustrating a method of controlling the power system according to an embodiment.

FIG. 8 is a flowchart illustrating the method of controlling the power system according to an embodiment.

Referring to FIG. 8, the method of controlling the power system including the plurality of Electronic Control Units (ECUs) including the first ECU and the second ECU which transfer power to a motor connected to an output terminal include a temperature section determining step (S800) of determining whether the first temperature information input from the first temperature sensor which senses the temperature generated from the first ECU corresponds to the normal section, the warning section, or the danger section, which are set in advance, a temperature comparison determining step (S810) of determining whether the first temperature information is less than the second temperature information input from the second temperature sensor which senses the temperature generated from the second ECU, in a case in which it is determined that the first temperature information corresponds to the warning section, and a controlling step (S820) of controlling the first ECU so that the first ECU reduces the power transferred to the motor in a case in which it is determined that the first temperature information is less than or equal to the second temperature information, and to control the first ECU and the second ECU so that the first ECU does not transfer the power to the motor and the second ECU transfers the power to the motor in a case in which it is determined that the first temperature information is greater than the second temperature information.

In an embodiment, the temperature section determining step (S800) may be a step of determining whether the first temperature information input from the first temperature sensor which senses the temperature generated from the first ECU and the second temperature information input from the second temperature sensor which senses the temperature generated from the second ECU correspond to a predetermined overheating section.

In an embodiment, the controlling step (S820) may be a step of controlling the first ECU and the second ECU so that the first ECU does not transfer the power and the second ECU transfers the power in a case in which it is determined that the first temperature information corresponds to the overheating section, and controlling the second ECU so that the second ECU reduces the power in a case in which it is determined that the second temperature information corresponds to the overheating section while the second ECU 330 transfers the power.

In an embodiment, the controlling step (S820) may be a step of controlling the first ECU and the second ECU so that the first ECU transfers the power and the second ECU does not transfer the power in a case in which it is determined that the first temperature information does not correspond to the overheating section while the second ECU transfers the power.

The first ECU and the second ECU included in the plurality of ECUs may be power transfer devices such as a converter or an inverter according to the characteristic of the battery and the characteristic of the motor.

In the temperature section determining step (S800) of the method of controlling the power system according to an embodiment, it may be determined whether the first temperature information input from the first temperature sensor which senses the temperature generated from the first ECU corresponds to the normal section, the warning section, or the danger section, which are set in advance.

The normal section may refer to a section to which the first temperature information corresponds in a case in which the first ECU is normally operated without a breakdown danger. The warning section may refer to a section to which the first temperature information corresponds in a case in which the first ECU is normally operated with some breakdown danger. The danger section may refer to a section to which the first temperature information corresponds in a case in which the first ECU is abnormally operated with the breakdown danger. In general, the normal section, the warning section, and the danger section may be set so as not to overlap one another. The normal section, the warning section, and the danger section may be set in advance on the basis of data of a previously performed experiment on the first ECU.

In the temperature comparison determining step (S810) of the method of controlling the power system according to an embodiment, in a case in which it is determined that the first temperature information corresponds to the warning section, it may be determined whether the first temperature information is less than or equal to the second temperature information input from the second temperature sensor.

In the controlling step (S820) of the method of controlling the power system according to an embodiment, in a case in which it is determined that the first temperature information is less than or equal to the second temperature information, the first control signal which controls the first ECU so that the first ECU reduces the power may be generated, and in a case in which it is determined that the first temperature information is greater than the second temperature information, the first control signal which controls the first ECU so that the first ECU does not transfer the power may be generated and the second control signal which controls the second ECU so that the second ECU transfers the power may be generated.

That is, in a case in which some breakdown danger is present in the first ECU (i.e., in a case in which the first ECU corresponds to the warning section) and the temperature generated from the first ECU is less than or equal to the temperature generated from the second ECU, in the controlling step (S820), the control signal which enables the first ECU to reduce the power transferred to the motor may be generated. Therefore, power loaded on the first ECU may be reduced, and thus the breakdown danger of the first ECU may be reduced.

In a case in which some breakdown danger is present in the first ECU (i.e., in a case in which the first ECU corresponds to the warning section) and the temperature generated from the first ECU is greater than the temperature generated from the second ECU, in the controlling step (S820), the control signal which enables the first ECU to perform control so as not to transfer power to the motor and the control signal which enables the second ECU to transfer power to the motor may be generated. Therefore, the power loaded on the first ECU is zero, and thus the breakdown danger of the first ECU may be reduced. In addition, the second ECU transfers the power to the motor, and thus the motor may be normally operated.

The method of controlling the power system according to an embodiment, which is operated as described above, can normally operate the motor by normally transferring the power to the motor, even while preventing the breakdown of the first ECU.

FIG. 9 is a flowchart illustrating an example of the operation of the power system according to another embodiment.

Referring to FIG. 9, the first ECU of the power system according to an embodiment may transfer the power to the motor (S900).

For example, in step S900, the operation of the first ECU may refer to the operation by the motor system rather than the operation by the power system according to an embodiment.

Specifically, the motor system which normally operates the motor may be present, and the power system according to an embodiment may be additionally connected to the motor system, and thus the motor may be controlled. The motor system may share the first ECU with the power system according to an embodiment. In addition, the motor system may synthesize a control signal generated from the motor system and a control signal generated from the power system 300 according to an embodiment. The motor system may input the synthesized control signals to the first ECU 310 to control the power input to the motor.

After step S900 is performed, the first temperature sensor included in the power system may sense the temperature information of the first ECU, and the temperature section determination unit included in the power system may determine whether the first temperature information corresponds to the predetermined overheating section (S910).

In step S910, in a case in which it is determined that the first temperature information corresponds to the overheating section (YES), the control signal input to the first ECU may be generated to control the first ECU so that the first ECU does not transfer the power to the motor, and the control signal input to the second ECU may be generated to control the second ECU so that the second ECU transfers the power to the motor (S920).

In step S910, in a case in which it is determined that the first temperature information does not correspond to the overheating section (NO), step S900 may be performed.

After step S920 is performed, the second temperature sensor included in the power system may sense the temperature information of the second ECU, and the temperature section determination unit included in the power system may determine whether the second temperature information corresponds to the predetermined overheating section (S930).

In step S930, in a case in which it is determined that the second temperature information corresponds to the overheating section (YES), the first temperature sensor included in the power system may sense the temperature information of the first ECU, and the temperature section determination unit included in the power system may determine whether the first temperature information corresponds to the predetermined overheating section (S940).

In step S930, in a case in which it is determined that the second temperature information does not correspond to the overheating section (NO), step S920 may be performed.

In step S940, in a case in which it is determined that the first temperature information corresponds to the overheating section (YES), the control signal input to the second ECU may be generated to control the second ECU so that the second ECU reduces the power transferred to the motor (S970).

In addition, the method of controlling the power system may perform control of all operations performed by the power system, which have been described with reference to FIGS. 3 to 7.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A power system comprising:
   a plurality of Electronic Control Units (ECUs) configured to transfer power to a motor connected to an output terminal;
   a temperature section determination unit configured to determine whether a first temperature input from a first temperature sensor which senses the temperature generated from a first ECU corresponds to one of preset temperature sections comprising a normal temperature section, a warning temperature section, or a danger temperature section;
   a temperature comparison determining unit configured to determine whether the first temperature is less than or equal to a second temperature input from a second temperature sensor which senses the temperature generated from a second ECU, in a case in which it is determined that the first temperature is within the warning temperature section; and a controller configured to control the first ECU so that the first ECU reduces the power in a case in which it is determined that the first temperature is within the danger temperature section and less than or equal to the second temperature, and to control the first ECU and the second ECU so that the first ECU does not transfer the power and the second ECU transfers the power in a case in which it is determined that the first temperature is within the danger temperature section and greater than the second temperature.

2. The power system of claim 1, wherein the controller performs control so as not to transfer the power by turning off a control signal input to a first power conversion circuit which is included in the first ECU, or performs control to transfer the power by turning on a control signal input to a second power conversion circuit which is included in the second ECU.

3. The power system of claim 2, wherein the controller performs control so as not to transfer the power by turning off a gate driver of the first power conversion circuit, or performs control to transfer the power by turning on a gate driver of the second power conversion circuit.

4. The power system of claim 1, wherein the controller performs control so as not to transfer the power by turning off a relay connected to an input terminal of the first ECU, or performs control to transfer the power by turning on a relay connected to an input terminal of the second ECU.

5. The power system of claim 1, wherein the second temperature sensor senses the temperature in a case in which it is determined that the first temperature is within the warning temperature section.

6. The power system of claim 1, wherein the controller comprises a first controller configured to control the first ECU and a second controller configured to control the second ECU, the first controller transmits information on controlling the first ECU so that the first ECU does not transfer the power, and the second controller controls the second ECU so that the second ECU transfers the power in a case in which the second controller receives, from the first controller, the information on controlling the first ECU so that the first ECU does not transfer the power.

7. The power system of claim 1, wherein the controller controls the first ECU and the second ECU so that the first ECU does not transfer the power and the second ECU transfers the power in a case in which it is determined that the first temperature is within the danger temperature section.

8. The power system of claim 1, wherein the controller controls the first ECU and the second ECU so that the first ECU and the second ECU do not transfer the power in duplicate.

9. A method of controlling a power system comprising a plurality of Electronic Control Units (ECUs) configured to transfer power to a motor connected to an output terminal, the method comprising:

determining whether a first temperature input from a first temperature sensor which senses the temperature generated from a first ECU corresponds to one of preset temperature sections comprising a normal temperature section, a warning temperature section, or a danger temperature section;

determining whether the first temperature is less than or equal to a second temperature input from a second temperature sensor which senses the temperature generated from a second ECU, in a case in which it is determined that the first temperature corresponds to the warning temperature section; and controlling the first ECU so that the first ECU reduces the power in a case in which it is determined that the first temperature is within the danger temperature section and less than or equal to the second temperature, and controlling the first ECU and the second ECU so that the first ECU does not transfer the power and the second ECU transfers the power in a case in which it is determined that the first temperature is within the danger temperature section and greater than the second temperature.

10. A power system comprising:

a plurality of Electronic Control Units (ECUs) configured to transfer power to a motor connected to an output terminal;

a temperature section determination unit configured to determine whether a first temperature input from a first temperature sensor which senses the temperature generated from a first ECU and a second temperature input from a second temperature sensor which senses the temperature generated from a second ECU correspond to a predetermined overheating section;

a controller configured to control the first ECU and the second ECU so that the first ECU does not transfer the power and the second ECU transfers the power, in a case in which it is determined that the first temperature is within the overheating section, and to control the second ECU so that the second ECU reduces the power, in a case in which it is determined that the first and second temperatures are within the overheating section while the second ECU transfers the power;

wherein the controller controls the first ECU and the second ECU so that the first ECU transfers the power and the second ECU does not transfer the power, in a case in which it is determined that the first temperature is within the overheating range section while the second ECU transfers the power.

11. A method of controlling a power system comprising a plurality of Electronic Control Units (ECUs) configured to transfer power to a motor connected to an output terminal, the method comprising:

determining whether a first temperature input from a first temperature sensor which senses the temperature generated from a first ECU and a second temperature input from a second temperature sensor which senses the temperature generated from a second ECU correspond to a predetermined overheating section;

controlling the first ECU and the second ECU so that the first ECU does not transfer the power and the second ECU transfers the power, in a case in which it is determined that the first temperature is within the overheating section, and controlling the second ECU so that the second ECU reduces the power, in a case in which it is determined that the first and second temperatures are within the overheating section while the second ECU transfers the power, wherein the controlling the first ECU and the second ECU comprising controlling the first ECU and the second ECU so that the first ECU transfers the power and the second ECU does not transfer the power, in a case in which it is determined that the first temperature is not within the overheating section while the second ECU transfers the power.

* * * * *